Feb. 9, 1971 E. D. MURBACH 3,561,117
DEHORNER AND HOCK CUTTER
Filed July 5, 1968
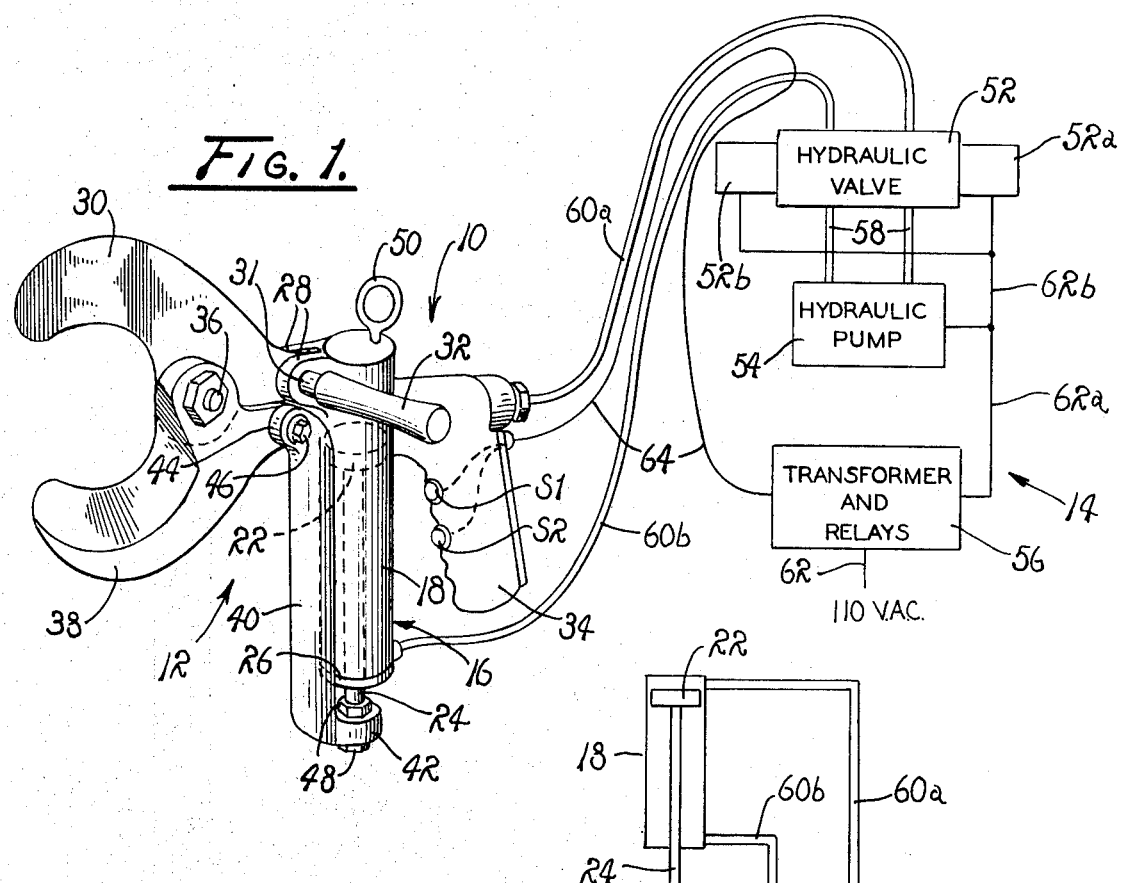
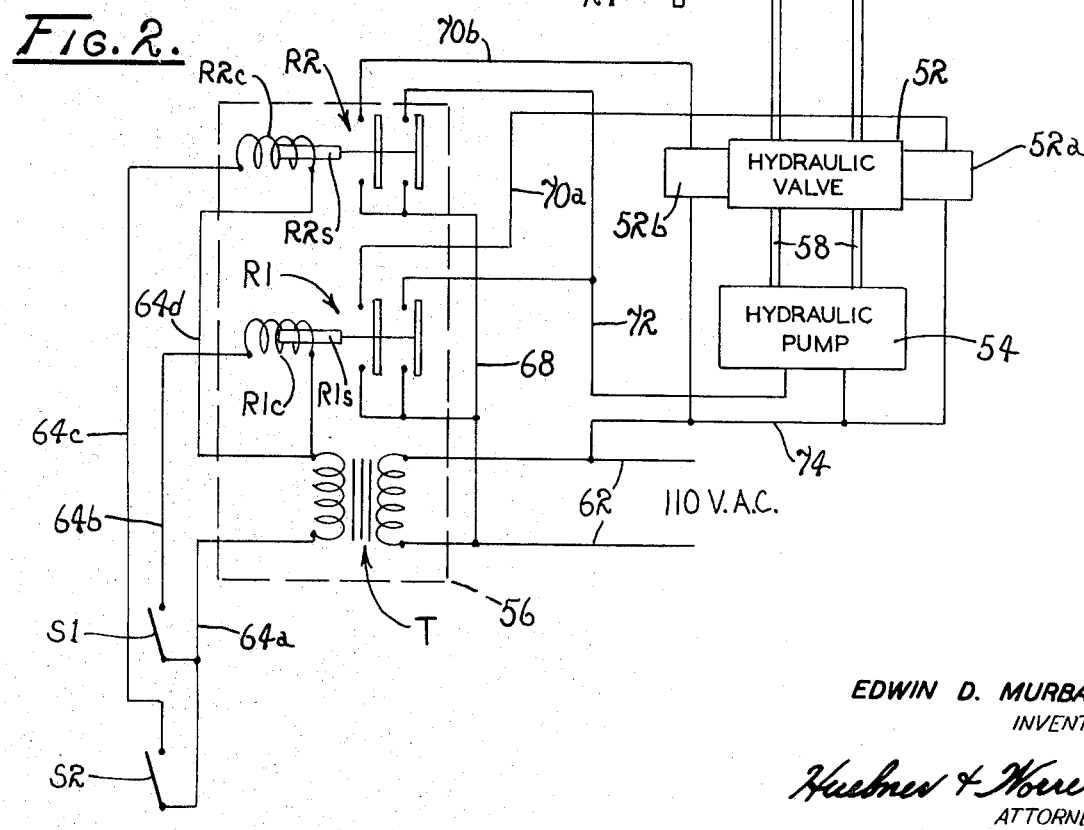
EDWIN D. MURBACH
INVENTOR
Huebner & Worrel
ATTORNEYS

United States Patent Office 3,561,117
Patented Feb. 9, 1971

3,561,117
DEHORNER AND HOCK CUTTER
Edwin D. Murbach, Fresno, Calif., assignor to Sierra Meat Co., a corporation of California
Filed July 5, 1968, Ser. No. 742,623
Int. Cl. B26b 15/00
U.S. Cl. 30—228                    1 Claim

ABSTRACT OF THE DISCLOSURE

A reliable device for cutting the horn and hock of a slaughtered animal by one person and consisting essentially of a pair of cutter blades relatively movable toward and away from each other, a double acting hydraulic ram operatively connected to the blades for effecting such relative movement in a positive manner, and electrical controls including selectively operable switch means for selectively actuating the hydraulic ram.

BACKGROUND OF THE INVENTION

The present invention relates to a cutter and more particularly to a dehorning and hock cutting device for use in high-speed production line slaughtering for cutting the horns and hocks of slaughtered animals in a reliable and rapid manner.

Conventional hock cutters have not proved entirely satisfactory in practice for high-speed production line slaughtering because of the fact that the hide around the base of the horn often becomes wedged between the cutter blade jaws so tightly that the blades cannot open by the power of biased springs with the result that the cutter jams and becomes inoperative. Jamming also often results from the binding effect of sinews caught between the blades during the cutting of the hocks. Such jammings are not only time consuming but constitute expensive delays because of the expensive time of the butchers and the costs of maintaining the cutter. The cost of down time because of jammed cutters has exceeded $50,000.00 a year in mderate sized slaughtering plants. In the slaughtering industry which is highly competitive, the cost of such down time can very well make the difference between a profit and a loss.

SUMMARY OF THE INVENTION

It is therefore an object of the present invention to provide a device for cutting the horns and hocks of slaughtered animals which overcomes the disadvantages and shortcomings of conventional hock cutters.

Another object is to provide a dehorning and hock cutting device which operates in a reliable manner and is relatively inexpensive to construct.

Another object is to provide a dehorner and hock cutter for use in high-speed production line slaughtering plants constructed to be operated in a facile, rapid and reliable manner. Another object is to provide a dehorner and hock cutter which is easily handled by one person and possesses safety features guarding against harm to the well-being of the person.

The aforementioned and other objects and advantages of the present invention are achieved by providing a double-acting hydraulic ram having a housing and a piston rod extending from one end of the housing, a cutting blade pivoted to one end of the housing and extending to one side thereof, a second blade pivotally mounted on the first blade, a substantially rigid link connected to the second blade and the piston rod, an operating handle fixed to the housing on the side thereof opposite to the fixed blade, a steadying handle fixed to the housing and disposed at an angle with respect to the operating handle and the blades, and means for selectively actuating the hydraulic ram including hydraulic mechanisms and electrical controls having selectively operable switch means carried by the operating handle and selectively operated by the operator of the cutter.

BRIEF DESCRIPTION OF DRAWING

FIG. 1 is a perspective view of a cutting device embodying the principles of the present invention, some of the actuating mechanisms thereof being shown schematically.

FIG. 2 is a schematic diagram illustrating the electrical controls of the present invention.

DESCRIPTION OF EMBODIMENT

Referring to the drawing, there is illustrated in FIG. 1 a cutting device 10 consisting essentially of a cutter 12 operatively connected to an actuating and control mechanism 14. The cutter 12 includes a double-acting hydraulic ram 16 including an elongated body or housing 18 formed with a cylindrical bore, not shown, which constitutes a piston chamber for the ram and houses a hydraulic piston 22 in the usual manner. Connected to the piston 22 is a connecting rod 24 which extends beyond the lower end of the housing 18 through a sealed aperture in an end cap 26 screwed to the end of the housing.

The upper end of the housing 18 is formed with a mounting bracket in the form of a pair of arms 28 to which a cutter blade 30 is pivotally connected by a pin 31. As shown in FIG. 1, the pin 31 is of elongated form and is provided with a steadying handle 32 disposed laterally of the blade and axially of the pivot axis thereof. Fixed to the housing 18 on the side thereof opposite to the blade 30 is an operating and control handle 34 of pistol grip or other suitable type.

Pivotally mounted on the cutter blade 30, as by a pivot bolt 36, is a cutter blade 38 which cooperates with the blade 30 to perform a shearing operation as a result of relative movement between the blades. Movement is imparted to the blades by actuation of the hydraulic ram 16 through a substantially rigid interconnection or link 40. To render the link 40 relatively light yet of substantial rigidity, it is preferably formed of arcuate cross section with oppositely directed projections 42 and 44. The projection 44 is bifurcated and is pivotally connected to the blade 38 by a pivot pin 46. The connecting rod 24 extends through the projection 42 and is fixed thereto by a pair of nuts 48.

A supporting ring 50 is secured to the upper end of the housing 18 for connecting the cutter 12 to a conventional balanced support mechanism disposed overhead.

The actuating and control mechanism 14 consists essentially of a system of hydraulic valves 52, a hydraulic pump 54 and a control panel 56. The system of hydraulic valves 52 is of conventional type including a pair of valves 52a and 52b connected to the hydraulic pump for receiving pressurized hydraulic fluid therefrom by way of hydraulic lines 58. The hydraulic valves are also connected to the cutter 12 by flexible hydraulic lines 60a and 60b, the latter being connected to the lower end of the housing 18 and in communication with the cylindrical bore at one end thereof, the line 60a communicating with the other end of the cylindrical bore as by a suitable passageway, not shown, in the operating handle 34 or by direct connection to the housing 18.

The control panel 56 is connected to a 110 volt alternating current line 62, such current being delivered to the hydraulic pump 54 and the hydraulic valves 52 via lines 62a and 62b. A control cable or harness 64 interconnects the control panel 56 and the operating handle 34 and, as will subsequently become apparent, delivers 12 volt current thereto, the handle carrying a pair of control switches S1 and S2.

Inviting attention to FIG. 2, the control cable 64 includes a line 64a interconnecting the switches S1 and S2 with one side of a transformer T which receives 110 volt alternating current from the line 62 and converts it into a lower voltage current for the safety of the operator of the cutter, for example, 12 volts. The cable also includes lines 64b and 64c which interconnect the switches S1 and S2 with a pair of relays R1 and R2, respectively. Each of the relays is of the solenoid operated type, the relay R1 having a solenoid R1s operatively positioned by passage of a current through a solenoid coil R1c, the relay R2 being similarly provided with a solenoid R2s and a coil R2c. Line 64b is connected to one end of the coil R1c and line 64c is connected to one end of the coil R2c, the other ends of the coils being connected by a common line 64d to the transformer T.

The relays are adapted to operate on 12 volt current for the safety of the operator, but are also adapted to deliver 110 volt alternating current to the hydraulic pump and valves in response to selective operation of the switches S1 and S2. Accordingly, 110 volt alternating current is delivered to the relays from the line 62 by way of a common line 68. Lines 70a and 70b connect the hydraulic valves 52a and 52b with the relays R1 and R2, respectively, a common line 72 interconnecting the relays with the hydraulic pump 54. The pump and the valves are interconnected with the line 62 by a common return 74.

OPERATION

The operation of the device of the present invention is believed to be clearly apparent and is briefly summarized at this point. With the operator holding the operating handle 34 with one hand and gripping the steadying handle 32 with the other hand and with the blades 30 and 38 in separated relation properly positioned relative to the horn or hock to be cut, the operator presses the switch S1 to close a circuit through line 64a, transformer T, line 64b, coil R1c of the relay R1 and return to the switch, thus causing passage of current through the coil R1c. This energizes the relay R1 and interconnects the hydraulic pump 54 and the hydraulic valve 52a with the 110 volt alternating current line causing the pump to deliver pressurized hydraulic fluid and the valve to route such pressurized fluid through the hydraulic line 60a causing the hydraulic ram 16 to extend and move the blade 38 toward the blade 30 for performing a cutting operation. The operator then releases switch S1 for deenergizing the relay R1 and cutting off current to the hydraulic pump and the hydraulic valve 52a. Switch S2 is then closed causing 12 volt current to be routed through the relay R2 via lines 64c and 64d for energizing the same and interconnecting the hydraulic pump and the hydraulic valve 52b to cause pressurized hydraulic fluid delivered by the pump to be routed through the hydraulic line 60b for actuating the hydraulic ram 16 to retract and move the cutting blade 38 away from the blade 30, after which the switch S2 is released and the elements of the device are stopped in their original starting positions.

There has thus been provided a dehorner and hock cutter which operates in a facile and reliable manner for moving the cutting blade 38 toward and away from the fixed blade 30 by the application of hydraulic power in each direction of movement, whereby any binding of the blades by skin or sinew is overcome in a positive manner thereby reducing the down time of the operator due to malfunctioning of the cutter.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

1. In a horn and hock cutter of the type including an elongated, sealed housing having means disposed at one end thereof supporting a first laterally extended cutting blade for pivotal movement about a transverse axis, a second cutting blade pivotally connected to said first blade and adapted to be moved relative thereto for cooperating therewith to perform a cutting operation, a steadying handle secured to said housing and extending laterally therefrom, an operating handle of a pistol grip configuration fixed to said housing adapted to be grasped by an operator, and an interconnecting link pivotally coupled to said second blade and extended therefrom adapted to be reciprocated for positively moving said second blade toward and away from said first blade for achieving a cutting operation of said cutter, the improvement comprising:

(A) an hydraulic ram including a positively driven, double-acting piston having a connecting rod axially extended therefrom, seated within said sealed housing in a manner such that the connecting rod is extended therefrom and adapted to be reciprocated as the piston positively is driven in reciprocating displacement, and coupling means coupling said connecting rod with said interconnecting link, whereby said second blade positively is advanced toward and away from said first blade as the piston positively is driven in reciprocating displacement;

(B) an hydraulic system operatively associated with said housing including an electrically responsive hydraulic pump associated with a source of hydraulic fluid adapted to be driven in response to an application thereto of a relatively high-voltage A.C. potential for providing a flow of hydraulic fluid, a pair of flexible conduits extended from opposite ends of the housing and operatively coupled with said pump whereby the pump is adapted to deliver fluid under pressure to the opposite ends of said housing through said pair of conduits, electrically responsive hydraulic valve means interposed between said pump and said housing adapted to be electrically driven in response to an application of a relatively high-voltage A.C. potential for selectively controlling delivery of fluid from said pump to said housing in a manner that fluid under pressure is delivered from said pump to the selected ends of said housing, whereby the opposite ends of the piston are selectively subjected to fluid under pressure for positively driving the piston in reciprocating displacement;

(C) a source of relatively high-voltage A.C. electrical potential;

(D) a high-voltage drive circuit including electrical leads coupling said electrically responsive pump and said electrically responsive valve means with said source of relatively high-voltage A.C. potential, and switch means including a pair of double-pole solenoid operated switches interposed in said leads adapted to be selectively operated for simultaneously making or breaking said circuit between the source of potential and the valve means and the source of potential and the pump in a manner such that the valve means is driven for selectively controlling delivery of fluid from said pump as the pump is driven for delivering fluid under pressure to said housing; and (E) a low-voltage control circuit coupled with said source of relatively high-voltage A.C. potential and with said pair of solenoid operated switches, including a converter adapted to convert relatively high-voltage electrical A.C. potential to relatively low-voltage D.C. electrical potential, flexible electrical leads extending from the converter through said operating handle electrically coupling said converter with said solenoid operated switches, and a pair of push-buttons operatively seated in said operating handle in a side-by-side relationship adapted to be manipulated by an operator for selectively controlling the operation of said second blade of said hock cutter, whereby said second blade of the hock cutter positively and selectively is driven toward and away from said first blade in response to a selective switching of the relatively low-voltage control circuit by the operator for thereby imposing a relatively high-voltage on said valve means and said pump for achieving a maximized output from the hock cutter.

References Cited

UNITED STATES PATENTS

| 2,918,042 | 12/1959 | Jensen | 91—459 |
|---|---|---|---|
| 3,177,584 | 4/1965 | Cockerill | 30—228 |
| 3,308,534 | 3/1967 | Steiner | 30—228 |

OTHER REFERENCES

H. K. Porter, Hydraulic Cutters, Mar. 9, 1964, p. 70, Electrical World.

ROBERT C. RIORDON, Primary Examiner

J. C. PETERS, Assistant Examiner